United States Patent Office 2,739,971
Patented Mar. 27, 1956

2,739,971
5-BENZAL-3-n-CETYL-2-PHENYLIMINO-4-THIAZOLIDONE

George W. Sawdey and James A. Van Allan, Rochester, N. Y., assignors to Eastman Kodak Company, Rochester, N. Y., a corporation of New Jersey No Drawing. Application March 29, 1954, Serial No. 419,582

1 Claim. (Cl. 260—306.7)

This invention relates to 5-benzal-3-n-cetyl-2-phenylimino-4-thiazolidone and a method for making the same.

Certain 3-lower alkyl-5-benzal-2-phenylimino-4-thiazolidones have long been known. These thiazolidones are useful as ultraviolet filtering agents, e. g. in layers of photographic elements. (See, for example, Sawdey U. S. application Serial No. 317,864, filed October 31, 1952.)

We have now found that 5-benzal-3-n-cetyl-2-phenylimino-4-thiazolidone also is useful as an ultraviolet absorbing agent, its efficiency and stability to daylight being many times that of the known thiazolidones.

It is, accordingly, an object of our invention to provide a new thiazolidone compound. Another object is to provide a method for making this compound. Other objects will become apparent from consideration of the following description and example.

The 5-benzal-3-n-cetyl-2-phenylimino-4-thiazolidone of our invention can be prepared by condensing together benzaldehyde and 3-n-cetyl-2-phenylimino-4-thiazolidone. The condensations can be accelerated by heating, although temperatures varying from ambient temperature to the reflux temperature can be employed. An inert diluent, e. g. acetic acid, methanol, ethanol, etc. can be used, if desired. Basic or acidic condensing agents can also be used, if desired. Typical condensing agents include organic amines (e. g. piperidine, triethylamine, etc.), acetic anhydride, alkali metal carboxylates (e. g. sodium acetate, potassium acetate, sodium benzoate, etc.), etc.

The following example will illustrate this method of preparation.

*Example.—5-benzal-3-n-cetyl-2-phenylimino-4-thiazolidone*

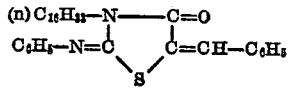

A mixture of 41.6 g. (0.1 mole) of 3-n-cetyl-2-phenylimino-4-thiazolidone, 13.8 g. (0.13 mole) of benzaldehyde, 12 ml. of piperidine and 200 ml. of ethanol was refluxed for 4 hours. The reaction mixture was chilled and the white crystalline product was collected by filtration and recrystallized from n-butanol. Yield 43 g., M. P. 74–5° C.

The 3-n-cetyl-2-phenylimino-4-thiazolidone used above was obtained as follows:

103 g. of 1-n-cetyl-3-phenylthiourea, 31 ml. of ethyl chloroacetate, 350 ml. of ethanol, and 27 ml. of pyridine were refluxed for 4 hours. The alcohol was evaporated, water was added and the crystalline product was filtered off and washed. Recrystallization from ethanol gave 99 g. of product, M. P. 55–6° C.

The 1-n-cetyl-3-phenylthiourea used above was obtained as follows:

72.3 g. (0.3 mole) of n-cetylamine in 150 ml. of ligroin was treated with 34 ml. of phenylisothiocyanate. On standing, the desired product crystallized out. Yield, 103 g.; M. P. 73–5° C.

As mentioned above, the 5-benzal-3-n-cetyl-2-phenylimino-4-thiazolidone of our invention can be employed in ultraviolet filtering layers in photographic elements. See Sawdey U. S. application Serial No. 419,239, filed on even date herewith. The new compound of our invention can also be used in photographic after-baths (i. e. after development), lacquers, glazes, etc. It can also be employed in suntan lotions, wrapping papers, etc. where it is desired to secure protection against the harmful effects of ultraviolet radiation.

What we claim as our invention and desire secured by Letters Patent of the United States is:

The compound represented by the following formula:

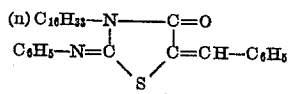

References Cited in the file of this patent

Davis et al.: Chem. Abst., vol. 30, cols. 1788–9 (1936).
Dains et al.: Chem. Abst., vol. 32, cols. 3396–7 (1938).
Schinzel et al.: Chem. Abst., vol. 33, col. 5807 (1939).